(12) United States Patent
Thomas et al.

(10) Patent No.: US 11,111,819 B2
(45) Date of Patent: Sep. 7, 2021

(54) IRON MATERIAL FOR HIGH-TEMPERATURE-RESISTANT BEARING BUSHINGS, BEARING BUSHING MADE OF SAID MATERIAL, AND TURBOCHARGER HAVING SUCH A BEARING BUSHING

(71) Applicant: CPT GROUP GMBH, Hannover (DE)

(72) Inventors: Martin Thomas, Regensburg (DE); Guenter Muench, Carlsberg (DE); Alexander Waas, Regensburg (DE)

(73) Assignee: CPT Group GmbH, Hannover (DE)

( * ) Notice: Subject to any disclaimer, the term of this patent is extended or adjusted under 35 U.S.C. 154(b) by 0 days.

(21) Appl. No.: 16/327,918

(22) PCT Filed: Jul. 31, 2017

(86) PCT No.: PCT/EP2017/069361
§ 371 (c)(1),
(2) Date: Feb. 25, 2019

(87) PCT Pub. No.: WO2018/036757
PCT Pub. Date: Mar. 1, 2018

(65) Prior Publication Data
US 2019/0218935 A1    Jul. 18, 2019

(30) Foreign Application Priority Data

Aug. 24, 2016   (DE) .......................... 102016215905.4

(51) Int. Cl.
*F01D 25/16*      (2006.01)
*C22C 37/08*      (2006.01)
(Continued)

(52) U.S. Cl.
CPC ............ *F01D 25/166* (2013.01); *C22C 30/02* (2013.01); *C22C 37/04* (2013.01); *C22C 37/08* (2013.01);
(Continued)

(58) Field of Classification Search
CPC ..... F02B 37/00–24; F01D 25/00; F16C 17/00
See application file for complete search history.

(56) References Cited

U.S. PATENT DOCUMENTS 2,472,027 A * 5/1949 Hancock ................. C22C 37/00
148/617
2,699,992 A * 1/1955 Spitz ....................... C22C 37/10
420/12
(Continued)

FOREIGN PATENT DOCUMENTS

CN       1400330 A      3/2003
CN    101668933 A      3/2010
(Continued)

*Primary Examiner* — Laert Dounis
(74) *Attorney, Agent, or Firm* — Laurence A. Greenberg; Werner H. Stemer; Ralph E. Locher

(57) ABSTRACT

Bearing bushings which are exposed to highly elevated temperatures during operation, corresponding high-temperature-resistant bearing bushings and exhaust-gas turbochargers having at least one such bearing bushing, include an iron material having a material composition which, apart from iron, has at least carbon, silicon, manganese, nickel, chromium, molybdenum and tungsten alloy constituents in certain amounts. This material composition ensures sufficient temperature resistance and self-lubricating properties with simultaneously good machining properties and a moderate price.

5 Claims, 1 Drawing Sheet

(51) Int. Cl.
*C22C 37/04* (2006.01)
*F16C 33/62* (2006.01)
*C22C 30/02* (2006.01)
*C22C 37/10* (2006.01)
*F02B 37/18* (2006.01)
*F16C 17/10* (2006.01)

(52) U.S. Cl.
CPC .............. *C22C 37/10* (2013.01); *F02B 37/18* (2013.01); *F16C 17/10* (2013.01); *F16C 33/62* (2013.01); *F05D 2220/40* (2013.01); *F05D 2300/111* (2013.01); *F16C 2204/60* (2013.01); *F16C 2360/24* (2013.01)

(56) References Cited

U.S. PATENT DOCUMENTS

| | | | |
|---|---|---|---|
| 5,996,348 A * | 12/1999 | Watkins | F02B 37/183 60/602 |
| 6,383,310 B1 * | 5/2002 | Otsuka | C22C 38/40 148/327 |
| 6,916,444 B1 | 7/2005 | Liang | |
| 7,998,238 B2 | 8/2011 | Takayama et al. | |
| 8,376,696 B2 | 2/2013 | Suzuki et al. | |
| 2009/0298726 A1 | 12/2009 | Ruch et al. | |
| 2010/0102910 A1 | 4/2010 | Waeckerle et al. | |
| 2011/0171016 A1 * | 7/2011 | Claude | C22C 37/04 415/200 |

FOREIGN PATENT DOCUMENTS

| | | | |
|---|---|---|---|
| CN | 104561752 A | 4/2015 | |
| DE | 1228068 B | 11/1966 | |
| DE | 10049598 A1 | 4/2002 | |
| DE | 10305568 A1 | 8/2003 | |
| DE | 112004001371 B4 | 2/2014 | |
| EP | 0471255 A1 | 2/1992 | |
| EP | 0668367 A1 * | 8/1995 | ............. C22C 38/48 |
| EP | 0739994 A1 | 10/1996 | |
| EP | 1724370 A1 | 11/2006 | |
| EP | 2029786 B1 | 1/2011 | |
| EP | 2710164 A2 | 3/2014 | |
| GB | 553397 A | 5/1943 | |
| GB | 1166709 A | 10/1969 | |
| JP | S57131348 A | 8/1982 | |
| JP | S61213348 A | 9/1986 | |
| WO | 2012156910 A2 | 11/2012 | |

* cited by examiner ial use.

IRON MATERIAL FOR HIGH-TEMPERATURE-RESISTANT BEARING BUSHINGS, BEARING BUSHING MADE OF SAID MATERIAL, AND TURBOCHARGER HAVING SUCH A BEARING BUSHING

BACKGROUND OF THE INVENTION

Field of the Invention

The invention relates to an iron material which is suitable for use for bearing bushings, in particular for self-lubricating plain bearing bushings, which are exposed to high temperatures of up to over 1000° C. during operation, and to a bearing bushing designed as a plain bearing, which bearing bushing is manufactured from this iron material, and to an exhaust-gas turbocharger which, in particular in its exhaust-gas turbine region, has such a bearing bushing made of this iron material.

The development of new technologies as well as the further development of corresponding apparatuses and methods in the direction of higher performance and efficiency whilst simultaneously reducing the use of resources are very often accompanied by increased demands on the materials used with regard to strength, temperature resistance, corrosion resistance and, in particular in plain bearing materials, also the self-lubricating properties. Furthermore, machinability and price naturally also play an important role in industrial use.

Vehicle construction, and in particular the development of internal combustion engines used therein, are traditionally subject to such a technological challenge, which places ever increasing demands.

To reduce fuel consumption and pollutant emissions while realizing the same or even increased power of the internal combustion engine, it is increasingly the case that small-volume engine concepts, so-called downsizing concepts, are taken as a starting point, which are equipped with exhaust-gas turbochargers for the purposes of increasing power. Here, in particular in the case of gasoline internal combustion engines, the prevailing high exhaust-gas temperatures of up to over 1000° C. constitute a major challenge for the materials used in the exhaust-gas turbine.

The operating principle of an exhaust-gas turbocharger consists in utilizing the energy contained in the exhaust-gas flow to increase the pressure in the intake tract of the internal combustion engine and in this way to bring about better charging of the combustion chamber with atmospheric oxygen and thus enable more fuel, gasoline or diesel, to be converted in each combustion process, that is to say to increase the power of the internal combustion engine.

To this end, the exhaust-gas turbocharger has an exhaust-gas turbine arranged in the exhaust tract of the internal combustion engine, a fresh-air compressor arranged in the intake tract and a rotor bearing arranged therebetween. The exhaust-gas turbine has a turbine housing and a turbine impeller arranged therein, which is driven by the exhaust-gas mass flow. The fresh-air compressor has a compressor housing and a compressor impeller arranged therein, which builds up a boost pressure. The turbine impeller and the compressor impeller are arranged for conjoint rotation on the opposite ends of a common shaft, referred to as the rotor shaft, and thus form what is referred to as the turbocharger rotor. The rotor shaft extends axially between the turbine impeller and compressor impeller through the rotor bearing arranged between the exhaust-gas turbine and fresh-air compressor, and is rotatably mounted in said rotor bearing in the radial and axial directions in relation to the rotor shaft axis. According to this construction, the turbine impeller driven by the exhaust-gas mass flow drives the compressor impeller via the impeller shaft, whereby the pressure in the intake tract of the internal combustion engine is increased in relation to the fresh-air mass flow downstream of the fresh-air compressor, and thus improved charging of the combustion chamber with atmospheric oxygen is realized.

In order to be able to ensure as dynamic as possible an adaptation of the operating parameters of the exhaust-gas turbocharger in particular in transient operating ranges, that is to say in the presence of changing loads and rotational speeds, bypass valves or so-called variable turbine geometries (VTG), for example, are used in the exhaust-gas turbine and in the fresh-air compressor for the purposes of controlling the fluid mass flows. These have actuating parts which are mounted so as to be movable relative to one another. In order to ensure the required ease of movement and longevity in operation, bearing bushings with self-lubricating properties are generally used for the mounting of these actuating parts relative to one another or in the respectively corresponding housing.

Examples of such actuating parts are inter alia bypass valves designed as a pivoting flap valve or linear flap valve, such as a wastegate or overrun air recirculation valve, adjustable turbine geometries with rotatable guide vanes or slidable guide grilles, and adjustable inlet, outlet, or diffuser cross sections with slide apparatuses.

By way of example, reference is made here in advance to the exhaust-gas turbocharger 100 according to the invention illustrated in FIG. 2. The main functional units of the exhaust-gas turbocharger are the exhaust-gas turbine 20 with turbine housing 21, the fresh-air compressor 30 with compressor housing 31, and the bearing unit 40 arranged therebetween. The turbocharger rotor, composed of turbine impeller 22, compressor impeller and rotor shaft, is rotatably mounted in the bearing unit 40. The turbine housing 21 is illustrated in cutaway form, so that the turbine impeller 22 and the wastegate valve 10 arranged in the turbine housing 21 are visible.

As is apparent from FIG. 2 by way of example on the basis of the illustrated cutaway turbine housing 21 with wastegate valve 10, the crank arm operating apparatus 11 has a crank arm 12 arranged in the interior of the turbine housing 21, to which crank arm the plate-shaped valve flap 13 is attached. In the closed state of the wastegate valve 10, the valve flap 13 lies sealingly on the valve seat 14 and thus closes the bypass channel.

The crank spindle 15 adjoining the crank arm 12 extends through the turbine housing 21 and is mounted in the turbine housing wall, so as to be rotatable about its axis, in a bearing bushing 1. Outside the turbine housing 21, an operating lever 18 is attached to the crank spindle 15, which operating lever is in turn engaged on, via the crank arm operating apparatus 11, by an operating actuator 19. An overrun air recirculation valve (not illustrated) in the compressor housing 31 may in principle have the same or a similar structure.

In order to simultaneously be able to utilize the heat energy generated during the combustion in the internal combustion engine with higher efficiencies by means of the exhaust-gas turbocharger, on top of that, the exhaust-gas temperatures are kept as high as possible as well. Owing to the hot exhaust gases that flow through the turbine housing, the latter is subjected to fluctuating thermal load with temperatures of up to over 1000° C. The respective bearing bushings are also subjected to these operating conditions, which bearing bushings must not fail during operation under these extreme loads.

In order to be able to meet these stringent requirements, heat-resistant special bearing materials have hitherto been used, as known for example from EP 2 029 786 B1. For example, these materials are based on an austenitic iron matrix alloy and have the alloy constituents

| C  | 0.4-0.6 wt. %,     |
|----|--------------------|
| Si | 2.9-3.2 wt. %,     |
| Ni | 12.0-22.0 wt. %,   |
| Cr | 18.0-27.0 wt. %,   |
| Nb | 1.4-1.8 wt. %,     |
| S  | 0.2-0.5 wt. %,     |
| W  | 2.4-2.8 wt. % and  |
| the remainder iron. |  |

In this case, reference is made in particular to the sulfur fraction for improving the lubricating effect by formation of sulfides within the metal structure.

Another material for heat-resistant bearing elements is known from EP 0 739 994 A1, which material is however based on a martensitic steel with the following alloy constituents:

| C  | 0.0-0.4 wt. %, |
|----|----------------|
| Si | 0.0-2.0 wt. %, |
| Mn | 0.0-2.0 wt. %, |
| Ni | 0.0-5.0 wt. %, |
| Cr | 3.5-7.0 wt. %, |
| Mo | 3.0-15.0 wt. %, |
| V  | 0.5-1.1 wt. %, |
| the remainder iron. |  |

This material is preferably used in rolling bearings and, although characterized by a good heat resistance, it has no self-lubricating properties.

Furthermore, as materials for bearing bushings, use is made of special cast steel materials which have a ferritic or austenitic structure in which carbides are incorporated as wear carriers. These are known for example under the designations PL26, PL29 and PL33.

For example, PL26 has the following alloy constituents:

| C  | 0.2-1.0 wt. %,    |
|----|-------------------|
| Si | 1.8-3.5 wt. %,    |
| Mn | 0.5-1.0 wt. %,    |
| Ni | 14.0-23.0 wt. %,  |
| Cr | 20.0-30.0 wt. %,  |
| Mo | 1.0-3.0 wt. %,    |
| Nb | 1.0-3.0 wt. %,    |
| S  | 0.2-1.0 wt. %,    |
| W  | 2.0-4.0 wt. % and |
| the remainder iron. |  |

However, the aforementioned known materials have the disadvantage that they are difficult to machine and have a high price, which makes them seem unsuitable for industrial mass production. Furthermore, adhesion wear cannot generally be prevented, which can lead to "seizing" between the friction partners and to increased adjustment forces. This is associated with an increased risk of failure, especially in the case of the long service lives required in the automotive industry.

SUMMARY OF THE INVENTION

The present invention is therefore based on the object of specifying a material which has a good suitability for the production of plain bearing bushings with self-lubricating properties, for use even at highly elevated temperatures, and at the same time is suitable for mass production owing to a moderate price and good machinability. Further objects on which the invention is based consist in specifying a bearing bushing and an exhaust-gas turbocharger which are distinguished by increased operational reliability with long service lives and a moderate price.

These objects are achieved by an iron material, in particular for high-temperature-resistant bearing bushings, a bearing bushing composed of this material, and an exhaust-gas turbocharger having such a bearing bushing, according to the respective features of the independent claims.

Advantageous embodiments and refinements, which may be used individually or, where they do not involve mutually exclusive alternatives, in combination with one another, form the subject matter of the dependent claims.

According to the invention, an iron material for high-temperature-resistant bearing bushings is claimed, which is characterized by a material composition which, apart from iron, Fe, has at least the following alloy constituents within the limits of the stated amounts in percent by weight:

carbon, C: 1.5 to 3.0 wt. %;
silicon, Si: 1.0 to 6.0 wt. %;
manganese, Mn: 0.5 to 7.00 wt. %;
nickel, Ni: 12.0 to 36.0 wt. %;
chromium, Cr: 0.2 to 16.00 wt. %;
phosphorus, P: up to 0.25 wt. %;
copper, Cu: up to 7.5 wt. %;
molybdenum, Mo: 0.5 to 5.0 wt. % and
tungsten, W: 0.3 to 2.0 wt. %.

Furthermore, additional alloy constituents may possibly be added in order to achieve certain properties. Furthermore, unavoidable impurities may be included in proportions which are negligible with regard to the material properties.

The invention is based here on the use of an already known base material from the group of austenitic cast iron grades according to DIN EN 13835, which lend themselves to a wide variety of applications owing to their specific properties and which are also known as so-called Ni-resist materials. These materials are characterized inter alia by good corrosion resistance, high scale resistance, high high-temperature strength, good resistance to temperature fluctuation, high ductility, good wear resistance and low-temperature toughness.

These materials have now, with regard to the increased particular requirements, been further improved with regard to the wear properties, corrosion resistance, scale resistance and high-temperature strength with simultaneously good machinability. This is achieved in a surprising manner by adding to the alloy between 0.3 and 2.0 wt. % of tungsten (W) and between 0.5 and 5.0 wt. % of molybdenum (Mo), with a simultaneous increase in the chromium fraction (Cr) to up to 16 wt. %.

By adding molybdenum, carbides are increasingly formed in the material structure, which increases wear resistance and high-temperature strength. However, since this can also have an adverse effect on castability and machinability, it must be ensured that the stated proportion is adhered to. In any case, the carbide content of the iron material according to the invention is then still below that of the hitherto conventional cast steel bushing materials, and the machinability remains at a significantly improved level in relation to these cast steel bushing materials.

The addition of tungsten duly increases the high-temperature strength owing to its high melting point. However, the amount must remain limited as otherwise increased carbide formation can occur, which in turn can have an adverse effect on the machinability.

The addition of chromium, however, has a positive effect on the resistance to hot-gas corrosion, wherein it must be ensured that chromium is added only in an amount that does not unduly hinder or even prevent the carbon precipitation during the solidification, the so-called gray solidification, which can otherwise have a detrimental effect on the self-lubricating properties of the iron material.

The iron material according to the invention is thus improved in terms of the properties of wear resistance, high-temperature strength and resistance to hot-gas corrosion in relation to the base material of the Ni-resist alloys, but largely retains its better machinability in relation to cast steel bushing materials. Taking a known Ni-resist alloy as a basis, and the comparatively good machinability, also have a positive effect on the price.

A further embodiment of the iron material according to the invention consists in a further refined adjustment of the alloy constituents, wherein said alloy constituents are added in the following narrower limits of the stated amounts in percent by weight:

carbon, C: 1.5 to 3.0%;
silicon, Si: 1.0 to 6.0%;
manganese, Mn: 1.5 to 7.00%;
nickel, Ni: 12.0 to 36.0%;
chromium, Cr: 6.0 to 12.00%;
phosphorus, P: 0.05 to 0.25%;
copper, Cu: 0.5 to 7.5%;
molybdenum, Mo: 2.0-5.0% and
tungsten, W: 0.8-2.0%.

With the stated material composition, the material properties required for use in turbine housings for exhaust-gas turbochargers are further improved and achieved with greater reliability.

In a particularly advantageous embodiment of the iron material according to the invention, free carbon is incorporated in the structure of the iron material in the form of lamellar graphite or nodular graphite or vermicular graphite in order to improve self-lubrication properties of the iron material. The form in which the graphite is incorporated depends also on the fractions of other alloy constituents. In any case, the carbon incorporated in the structure has an advantageous effect on the self-lubrication of the iron material, for example when used for bearing bushings.

The bearing bushing according to the invention for use under high-temperature conditions, in particular in exhaust-gas turbines of exhaust-gas turbochargers, is characterized in that the bearing bushing has an iron material having the stated fractions of the stated alloy constituents according to one of the abovementioned embodiments according to the invention of the iron material, or is manufactured from such an iron material.

An exhaust-gas turbocharger according to the invention has an exhaust-gas turbine, a fresh-air compressor and a bearing unit, wherein the exhaust-gas turbocharger is equipped with at least one movable actuating apparatus for influencing the fluid mass flows flowing through the exhaust-gas turbine and/or the fresh-air compressor, wherein the actuating apparatus is mounted movably by means of at least one bearing bushing, and wherein the bearing bushing has an iron material having the stated fractions of the stated alloy constituents according to one of the abovementioned embodiments according to the invention of the iron material, or is manufactured from such an iron material.

The advantages of such an exhaust-gas turbocharger lie, owing to the self-lubricating properties of the bearing bushing material, in reduced operating forces of the actuating apparatus, reduced wear and thus a lengthened service life of the exhaust-gas turbocharger.

A specific embodiment of the aforementioned exhaust-gas turbocharger according to the invention is characterized in that the at least one actuating apparatus is a wastegate valve, an overrun air recirculation valve or an adjustable turbine geometry. It is self-evident that the exhaust-gas turbocharger according to the invention may also have several of the aforementioned actuating apparatuses in combination, such as a wastegate valve in the exhaust-gas turbine and an overrun air recirculation valve in the fresh-air compressor, or an adjustable turbine geometry in the exhaust-gas turbine and an overrun air recirculation valve in the fresh-air compressor.

In particular in the case of the bearing bushing according to the invention being used for the mounting of the crank spindle of a wastegate valve or for the mounting of the operating spindle of an adjustable turbine geometry, that is to say in the hot region of the exhaust-gas turbocharger, the improved material properties of the iron material according to the invention of the corresponding bearing bushings with regard to wear resistance, high-temperature strength, resistance to temperature fluctuation and corrosion resistance are particularly advantageous.

Exemplary embodiments of the invention will be explained in more detail hereinbelow on the basis of the illustrations in the drawing.

DESCRIPTION OF THE INVENTION

Figure 1:
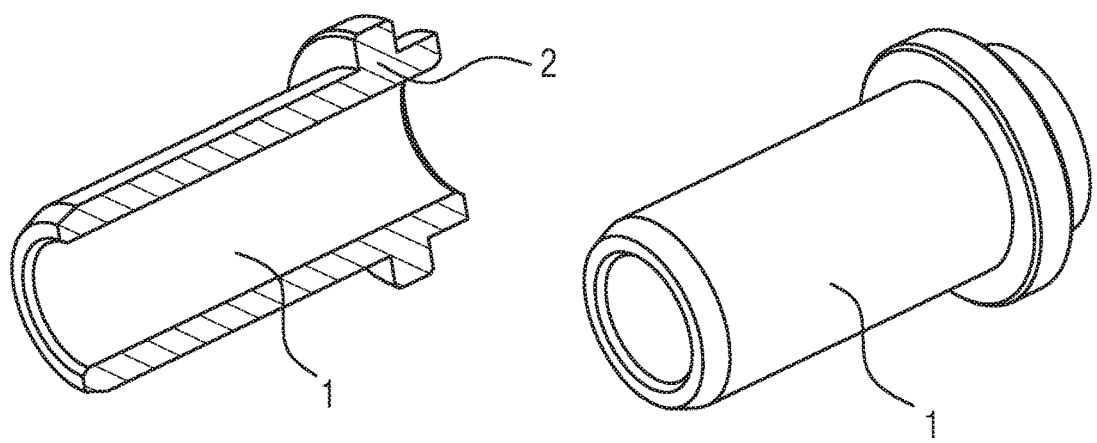
FIG. 1 shows an exemplary embodiment of a bearing bushing according to the invention in a perspective illustration in a half-section on the left-hand side of the figure and in its entirety on the right-hand side of the figure.

The example of a bearing bushing 1 according to the invention illustrated in FIG. 1 is composed of an iron material 2 according to the invention. The shape and dimensioning of such a bearing bushing may vary depending on design requirements. The illustrated example may for example be used as a bearing bushing for the rotary mounting of a crank spindle of a wastegate valve in the exhaust-gas turbocharger.

Figure 2:
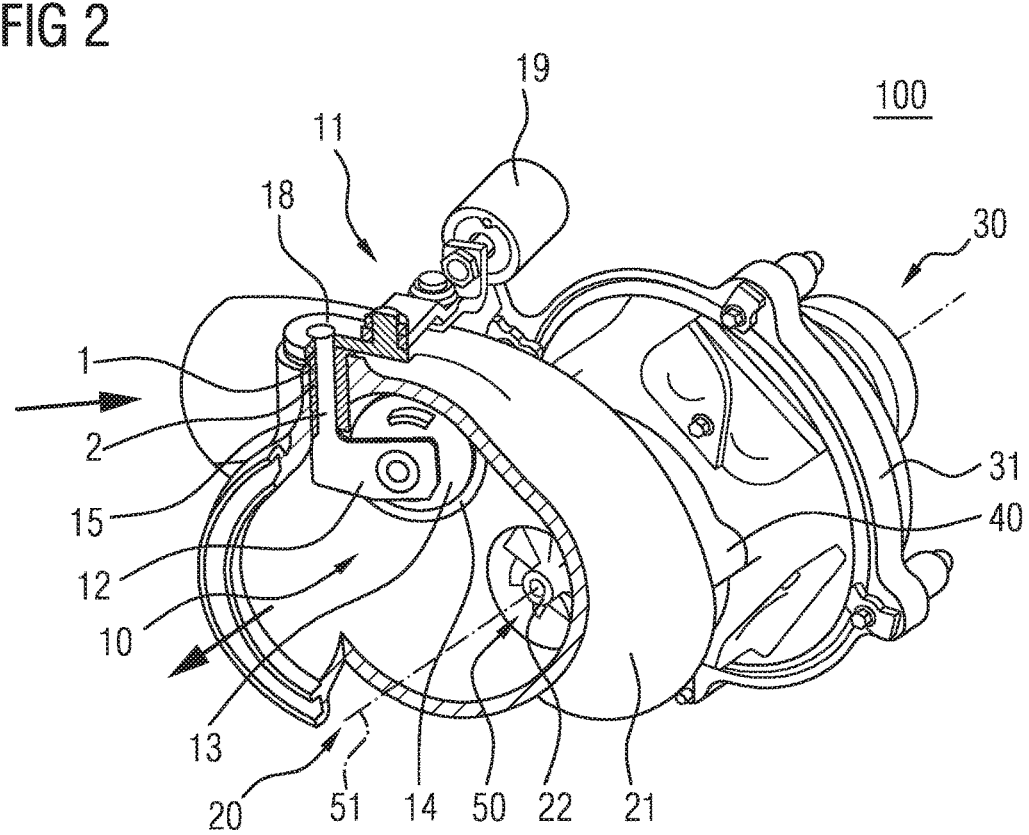
FIG. 2 shows an exemplary embodiment of an exhaust-gas turbocharger according to the invention in a perspective illustration with cutaway turbine housing.

FIG. 2 shows an exemplary embodiment of an exhaust-gas turbocharger 100 according to the invention with cutaway turbine housing 21. The sectional illustration provides an insight here into the structure and the mounting of the wastegate valve 10 with the crank arm operating device 11 and the operating actuator 19.

As already described in the introduction, the exhaust-gas turbocharger has an exhaust-gas turbine 20, a fresh-air compressor 30 and a bearing unit 40. The exhaust-gas turbine 20 is equipped with a wastegate valve 10 and the exhaust-gas mass flow AM is indicated by arrows. The fresh-air compressor 30 has, for example, an overrun air recirculation valve (not illustrated). In general, a conventional exhaust-gas turbocharger 100, as illustrated in FIG. 2, has a multi-part construction. Here, a turbine housing 21 that is arrangeable in the exhaust tract of the internal combustion engine, a compressor housing 31 that is arrangeable in the intake tract of the internal combustion engine, and, between the turbine housing 21 and compressor housing 31, a bearing unit 40, are arranged adjacent to one another on a common turbocharger axis and are connected to one another in terms of assembly.

The so-called turbocharger rotor 50 of the exhaust-gas turbocharger 100 is composed of the turbine impeller 22, the compressor impeller (not illustrated) and the rotor shaft (not illustrated).

A further structural unit of the exhaust-gas turbocharger 100 is the turbocharger rotor 50, which has a rotor shaft (not illustrated), a turbine impeller 22 with an impeller blading arranged in the turbine housing 21, and a compressor impeller (not illustrated) with an impeller blading arranged in the compressor housing 31. The turbine impeller 22 and the compressor impeller are arranged on the opposite ends of the common rotor shaft and connected thereto for conjoint rotation. The rotor shaft extends in the direction of the turbocharger axis axially through the bearing unit 40 and is mounted rotatably therein, axially and radially about its longitudinal axis, the rotor axis of rotation 51, by means of radial bearings and an axial bearing, wherein the rotor axis of rotation 51 lies in the turbocharger axis, that is to say coincides therewith. The turbocharger rotor 50 rotates during operation about the rotor axis of rotation 51 of the rotor shaft. The rotor axis of rotation 51 and at the same time the turbocharger axis are illustrated by the indicated centerline and identify the axial orientation of the exhaust-gas turbocharger 100.

As is apparent from FIG. 2 by way of example on the basis of the illustrated cutaway turbine housing 21 with wastegate valve 10, the crank arm operating apparatus 11 has a crank arm 12 arranged in the interior of the turbine housing 21, to which crank arm the plate-shaped valve flap 13 is attached. In the closed state of the wastegate valve 10, the valve flap 13 lies sealingly on the valve seat 14 and thus closes the bypass channel.

The crank spindle 15 adjoining the crank arm 12 extends through the turbine housing 21 and is mounted in the turbine housing wall, so as to be rotatable about its axis, in a bearing bushing 1 according to the invention, which is manufactured from an iron material 2 according to the invention. Outside the turbine housing 21, an operating lever 18 is attached to the crank spindle 15, which operating lever is in turn engaged on, via further transmission elements of the crank arm operating apparatus 11, by an operating actuator 19. An overrun air recirculation valve (not illustrated) in the compressor housing 31 may in principle have the same or a similar structure.

It is self-evident that the exhaust-gas turbocharger according to the invention is not limited to the exemplary embodiment illustrated in FIG. 2, but also encompasses other embodiments, for example with variable turbine geometries (VTG) and/or with adjustable compressor inlet openings and/or adjustable compressor diffusers and/or adjustable turbine outlet openings. In this case, the iron material according to the invention may advantageously be used wherever actuating parts are moved and, as a result, corresponding bearing points, in particular bearing bushings, are required.

The invention claimed is:

1. An iron material, comprising:
a material composition including iron, Fe and at least alloy constituents within limit amounts stated below in percent by weight, wt. %:
carbon, C: 1.5 to 3.0 wt. %;
silicon, Si: 1.0 to 6.0 wt. %;
manganese, Mn: 1.5 to 7.00 wt. %;
nickel, Ni: 12.0 to 36.0 wt. %;
chromium, Cr: 6.0 to 12.00 wt. %;
phosphorus, P: 0.05 to 0.25 wt. %;
copper, Cu: 0.5 to 7.5 wt. %;
molybdenum, Mo: 2.0 to 5.0 wt. %; and
tungsten, W: 0.8 to 2.0 wt. %,
wherein the carbon constituent comprises free carbon incorporated into a structure of the iron material composition as lamellar graphite, nodular graphite, or vermicular graphite to improve self-lubrication properties of the iron material.

2. The iron material according to claim 1, wherein said material composition forms a high-temperature-resistant bearing bushing.

3. A bearing bushing for use under high-temperature conditions, the bearing bushing comprising or being manufactured from the iron material according to claim 1.

4. An exhaust-gas turbocharger, comprising:
an exhaust-gas turbine;
a fresh-air compressor;
a bearing unit;
at least one movable actuating apparatus for influencing fluid mass flows flowing through at least one of said exhaust-gas turbine or said fresh-air compressor; and
at least one bearing bushing for use under high-temperature conditions, said at least one bearing bushing movably mounting said actuating apparatus, and said at least one bearing bushing including or being manufactured from the iron material according to claim 1.

5. The exhaust-gas turbocharger according to claim 4, wherein said at least one actuating apparatus is a wastegate valve, an overrun air recirculation valve or an adjustable turbine geometry.

* * * * *